(12) United States Patent
Lee et al.

(10) Patent No.: US 11,806,969 B2
(45) Date of Patent: Nov. 7, 2023

(54) METHOD OF MANUFACTURING DISPLAY DEVICE

(71) Applicant: Samsung Display Co., Ltd., Yongin-si (KR)

(72) Inventors: Hee Young Lee, Hwaseong-si (KR); Jeong Kug Lee, Seoul (KR); Jung-Hun Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/244,367

(22) Filed: Apr. 29, 2021

(65) Prior Publication Data

US 2022/0055349 A1    Feb. 24, 2022

(30) Foreign Application Priority Data

Aug. 18, 2020  (KR) .................. 10-2020-0103378

(51) Int. Cl.
| | | |
|---|---|---|
| *B32B 41/00* | (2006.01) | |
| *B32B 17/10* | (2006.01) | |
| *G01N 21/958* | (2006.01) | |
| *G01B 11/06* | (2006.01) | |
| *G01N 21/17* | (2006.01) | |

(52) U.S. Cl.
CPC .... *B32B 17/1099* (2013.01); *B32B 17/10293* (2013.01); *B32B 41/00* (2013.01); *G01B 11/06* (2013.01); *G01N 21/17* (2013.01); *G01N 21/958* (2013.01); *B32B 2041/04* (2013.01); *B32B 2307/42* (2013.01); *B32B 2457/20* (2013.01); *G01N 2021/1765* (2013.01)

(58) Field of Classification Search
CPC .......... B32B 17/1099; B32B 17/10293; B32B 41/00; B32B 2041/04; B32B 2307/42; B32B 2457/20; G01B 11/06; G01N 21/17; G01N 21/958; G01N 2021/1765; G01N 2021/8848; G02F 1/1309; G02F 2203/69; G02F 1/133302
USPC .................. 156/60, 64, 350, 351, 378, 379
See application file for complete search history.

(56) References Cited

U.S. PATENT DOCUMENTS

2015/0077742 A1* 3/2015 Wootton ............ G01N 21/8806
356/239.3

FOREIGN PATENT DOCUMENTS

| KR | 10-2009-0093597 A | 9/2009 |
|---|---|---|
| KR | 10-2012-0129547 A | 11/2012 |
| KR | 10-2015-0049159 A | 5/2015 |
| KR | 10-2015-0091920 A | 8/2015 |
| KR | 10-2016-0004099 A | 1/2016 |
| KR | 10-2016-0148339 A | 12/2016 |
| KR | 10-2082204 | 2/2020 |

\* cited by examiner

*Primary Examiner* — Michael N Orlando
*Assistant Examiner* — Joshel Rivera
(74) *Attorney, Agent, or Firm* — Lewis Roca Rothgerber Christie LLP

(57) ABSTRACT

A method of manufacturing a display device includes: providing a glass including an edge region and an inner region; arranging a light source under the glass; setting a center position of the light source to correspond to an inside of the edge region or an inside of the inner region of the glass; directing light into the glass by using the light source; and detecting a defect in the edge region of the glass by receiving light passing through the glass by using a detection camera.

5 Claims, 15 Drawing Sheets

FIG. 2B
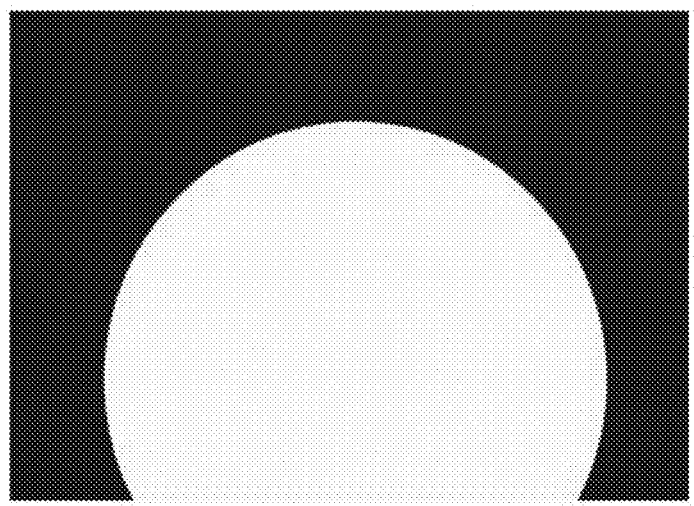
IMG1
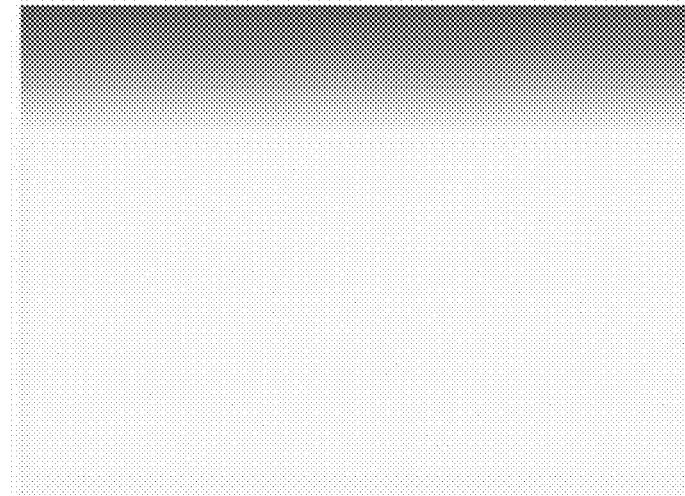
IMG2

METHOD OF MANUFACTURING DISPLAY DEVICE

CROSS-REFERENCE TO RELATED APPLICATION

This application claims priority to and the benefit of Korean Patent Application No. 10-2020-0103378, filed on Aug. 18, 2020 in the Korean Intellectual Property Office, the entire content of which is incorporated herein by reference.

BACKGROUND

1. Field

Aspects of embodiments of the present invention relate to a method of manufacturing a display device.

2. Description of the Related Art

Display devices, which include a liquid crystal display (LCD) and an organic light-emitting diode (OLED) display, may include a glass (or cover glass) for protecting a display panel and various components. Since the glass must have high light transmittance while having impact resistance, scratch resistance, and bending resistance for protecting the components, it may be manufactured with a glass material (for example, tempered glass) with improved physical properties through manufacturing processes such as heat treatment or chemical treatment.

However, during the manufacturing process of the glass, micro-defects may occur in an edge region of the glass (a region having a width (e.g., a predetermined width) including an edge or border of the glass). Examples of the micro-defects include cracks, scratches, foreign materials, etc., at a level of several tens of μm that are difficult to detect with the naked eye. Particularly, in the case of products to which foldable, rollable, and slidable displays, that is, displays that may be deformed during use, are applied, when a crack in the edge region of the glass occurs, it may lead to product defects.

The above information disclosed in this Background section is only for enhancement of understanding of the background of the described technology, and, therefore, it may contain information that does not form the prior art that is already known in this country to a person of ordinary skill in the art.

SUMMARY

According to an aspect of embodiments of the present invention, a method of manufacturing a display device that may improve visibility in detecting micro-defects that may occur in an edge region of a glass is provided.

According to another aspect of embodiments of the present invention, a method of manufacturing a display device that may improve detection capability (or detection resolution) of micro-defects that may occur in an edge region of a glass is provided.

It should be noted that aspects and objects of the present invention are not limited to the above-described aspects and objects, and other aspects and objects of the present invention will be apparent to those skilled in the art from the following descriptions.

According to one or more embodiments, a method of manufacturing a display device includes: providing a glass including an edge region and an inner region; arranging a light source under the glass; setting a center position of the light source to correspond to an inside of the edge region or an inside of the inner region of the glass; directing light into the glass by using the light source; and detecting a defect in the edge region of the glass by receiving light passing through the glass by using a detection camera.

The directing of the light into the glass may further include adjusting a position of the light source such that light emitted from the light source enters the glass at an angle (e.g., a predetermined angle).

The angle may be an acute angle.

The angle may be determined in consideration of at least one of a performance of the detection camera, a size of a defect to be detected, and a thickness of the glass.

The detecting of the defect in the edge region may further include: readjusting a position of the light source when it is determined that quality of a result of detecting the defect needs to be adjusted; and detecting a defect in the edge region by using the light source with the readjusted position.

The method may further include arranging a polarizing member under the glass, wherein the detecting of the defect in the edge region may include detecting a defect in the edge region of the glass by receiving light passing through the polarizing member and the glass by using the detection camera.

The polarizing member may be arranged to cover at least a portion of the edge region of the glass or at least a portion of the inner region of the glass.

The directing of the light into the glass may include vertically directing the light emitted from the light source into the glass.

According to one or more embodiments, a method of manufacturing a display device includes: providing a glass including an edge region and an inner region; arranging a polarizing member under the glass; arranging a light source under the polarizing member; setting a center position of the light source to correspond to an inside or outside of the edge region of the glass; directing light into the polarizing member and the glass by using the light source; and detecting a defect in the edge region of the glass by receiving light passing through the polarizing member and the glass by using a detection camera.

The polarizing member may be arranged to cover at least a portion of the inside of the edge region of the glass or at least a portion of the outside of the edge region.

The directing of the light into the glass may include vertically directing the light emitted from the light source into the glass.

The directing of the light into the glass may further include adjusting a position of the light source such that light emitted from the light source enters the glass at an angle (e.g., a predetermined angle).

The angle may be an acute angle.

The angle may be determined in consideration of at least one of a performance of the detection camera, a size of a defect to be detected, and a thickness of the glass.

The detecting of the defect in the edge region may further include: readjusting the position of the light source when it is determined that quality of a result of detecting the defect needs to be adjusted; and detecting a defect in the edge region by using the light source with the readjusted position.

According to one or more embodiments, a method of manufacturing a display device includes: providing a glass including an edge region and an inner region; arranging a light source under the glass; setting a center position of the light source to correspond to a first point of the glass; directing light into the glass by using the light source; first detecting a defect in the edge region of the glass by receiving light passing through the glass by using a detection camera; adjusting the center position of the light source to correspond to a second point of the glass based on a result obtained by the first detecting; and second detecting a defect in the edge region by using the light source with the adjusted center position.

The method may further include: calculating an association with the center position of the light source to obtain a desired detection result quality, based on data of at least one of the first point, the result obtained by the first detecting, the second point, and a result obtained by the second detecting; and determining the center position of the light source based on the association.

The directing of the light into the glass may further include adjusting a position of the light source such that light emitted from the light source enters the glass at an angle (e.g., a predetermined angle).

The directing of the light into the glass may include vertically directing the light emitted from the light source into the glass.

The method may further include arranging a polarizing member under the glass.

According to embodiments, by adjusting a center position of a light source emitting light for detecting micro-defects of a glass and an incident angle of light to the glass, it is possible to improve visibility and detection capacity for micro-defects in an edge region of the glass. In addition, since surface reflection and internal reflection that may occur when light for detecting micro-defects of a glass is incident on the glass by using a polarizing member may be minimized or reduced, it is possible to significantly reduce a defect rate of products.

In addition, according to embodiments, by calculating a correlation between a center position of a light source and result quality for obtaining a desired detection result quality and by applying the correlation to a subsequent inspection process, it is possible to improve quality of inspection results while reducing a cost and time required in an inspection process.

BRIEF DESCRIPTION OF THE DRAWINGS

FIG. 2A and FIG. 2B illustrate schematic views for explaining an operation example of the apparatus for detecting the micro-defect of FIG. 1.

---

Figure 1:
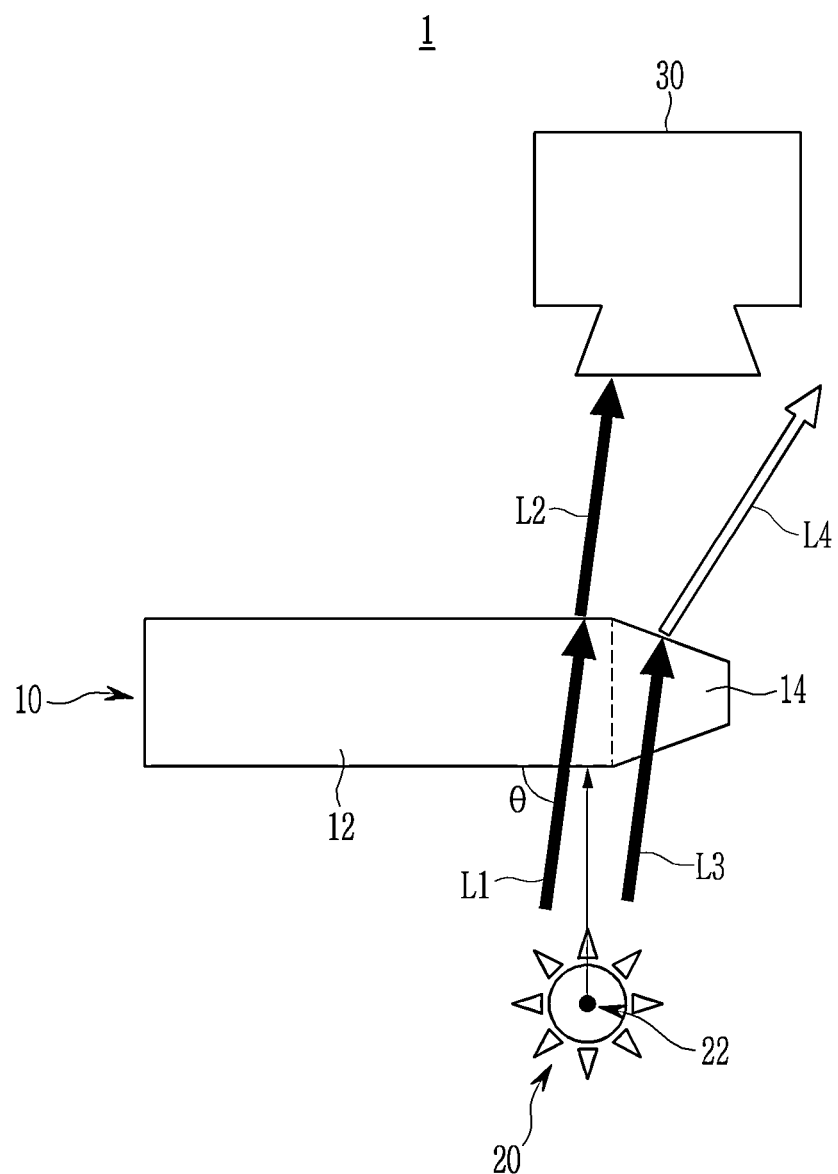
FIG. 1 illustrates a schematic view for explaining an apparatus for detecting a micro-defect according to an embodiment.

1, 2, 3, 4: apparatus for detecting micro-defect
10: glass
12: inner region
14: edge region
20: light source
22: center of light source
30: detection camera
40, 40a, 40b: polarizing member

---

DETAILED DESCRIPTION

The present invention will be described more fully herein with reference to the accompanying drawings, in which some embodiments of the invention are shown. As those skilled in the art would realize, the described embodiments may be modified in various different ways, all without departing from the spirit or scope of the present disclosure.

Parts that are irrelevant to the description may be omitted to clearly describe the present disclosure, and like reference numerals designate like elements throughout the specification.

Further, in the drawings, the size and thickness of each element may be arbitrarily illustrated for ease of description, and the present disclosure is not necessarily limited to those illustrated in the drawings. In the drawings, the thicknesses of layers, films, panels, regions, etc., may be exaggerated for clarity. In the drawings, for ease of description, the thicknesses of some layers and areas may be exaggerated.

It is to be understood that when an element, such as a layer, film, region, or substrate, is referred to as being "on" another element, it may be directly on the other element or one or more intervening elements may also be present. In contrast, when an element is referred to as being "directly on" another element, there are no intervening elements present. Further, in the specification, the words "on" or "above" mean positioned on or below the object portion, and do not necessarily mean positioned on an upper side of the object portion based on a gravitational direction.

In addition, unless explicitly described to the contrary, the word "comprise" and variations, such as "comprises" or "comprising," will be understood to imply the inclusion of stated elements but not the exclusion of any other elements.

Further, throughout the specification, the phrases "in a plan view" or "on a plane" mean viewing a target portion from the top, and the phrases "in a cross-section" or "on a cross-section" mean viewing a cross-section formed by vertically cutting a target portion from the side.

Unless otherwise defined, all terms (including technical and scientific terms) used herein have the same meaning as terms commonly understood by those skilled in the art to which this invention belongs. Also, terms such as terms defined in commonly used dictionaries should be interpreted as having meaning consistent with meaning in the context of the related art, and unless the term is interpreted in an ideal or overly formal sense, they are explicitly defined here.

FIG. 1 illustrates a schematic view for explaining an apparatus for detecting a micro-defect according to an embodiment.

Referring to FIG. 1, an apparatus 1 for detecting a micro-defect according to an embodiment may inspect a glass 10 by using a light source 20 and a detection camera 30. Particularly, the apparatus 1 for detecting the micro-defect may detect a micro-defect that may occur in an edge region 14 of the glass 10 to check whether a product is defective.

The glass 10 may be made of a glass material (for example, tempered glass) with improved physical properties through a manufacturing process such as heat treatment or chemical treatment so as to provide clear image quality while protecting a display panel and various components of a display device. For example, the glass 10 may be made of ultra-thin glass (UTG). The UTG is an ultra-thin tempered glass material component that may be used as a display cover, and has a thickness less than about 100 μm (for example, about 30 μm); thus, the UTG is very thin and may be flexibly folded, and also has the characteristics of a scratch-resistant glass material.

However, the present invention is not limited thereto, and the glass 10 may be made of other materials including plastics with good light transmittance while having durability for protecting a foldable, rollable, or slidable display, that is, a display that may be deformed during use. For example, the glass 10 may be made of transparent polyimide (TPI) or colorless polyimide (CPI). Here, the transparent polyimide (TPI) or colorless polyimide (CPI) is made transparent by changing its chemical structure in order to remove a color of polyimide (PI) while maintaining chemical and heat resistance characteristics of existing polyimide (PI), and, thus, may be processed transparent and thin due to the nature of the plastic material, and further has good flexibility, and may be applied as a display cover that protects a flexible display panel such as foldable and rollable panels.

However, the present invention is not limited thereto, and the glass 10 may be manufactured of a combination of UTG and transparent polyimide, manufactured of other materials, or manufactured of a combination of two or more different materials.

In embodiments, an inner region 12 and the edge region 14 may be defined in the glass 10. Here, the edge region 14 is a region having a width (e.g., a predetermined width) including an edge or border of the glass 10, and, as shown in FIG. 1, may be defined to include a chamfered region. In an embodiment, the inner region 12 may be defined as an inner region surrounded by the edge region 14 in the glass 10 except for the edge region 14. Embodiments of the present invention described below are mainly described in a case in which micro-defects that may occur in the edge region 14, such as cracks, scratches, foreign materials, and the like, may be detected, but the present invention is not limited thereto.

The light source 20 may be disposed under the glass 10 to irradiate light onto the glass 10. That is, the light source 20 may cause light emitted from the light source 20 to be incident to the glass 10. The light source 20 may emit light having a frequency or wavelength set to be suitable for detecting defects according to a specific implementation purpose of the present invention, and may be implemented as any of various light sources, such as a point light source and a surface light source.

The detection camera 30 may receive light that passes (or transmits) through the glass 10, and may detect a defect in the edge region 14 of the glass 10 therefrom. For example, the detection camera 30 may include a charge-coupled device (CCD) or a complementary metal oxide semiconductor (CMOS) image sensor that may convert an image of light emitted from the light source 20 into an electrical signal.

According to a specific implementation purpose, the detection camera 30 may include a processing element that may perform defect detection from data acquired by using an image sensor after light reception, a communication interface that may transmit the data acquired by using the image sensor after light reception to a processing device dedicated to defect detection, and an input/output interface that can store the data acquired by using the image sensor after light reception into a storage device.

In an embodiment, a center position 22 of the light source 20 may be set to correspond to an inside of the edge region 14 or the inner region 12 of the glass 10. As indicated by an arrow extending vertically from the center position 22 of the light source 20 in FIG. 1, the center position 22 of the light source 20 may be set to correspond to the inside of the inner region 12 of the glass 10. However, unlike that shown in FIG. 1, the center position 22 of the light source 20 may be set to correspond to the inside of the edge region 14 of the glass 10. It should be noted that, in any case, the center position 22 of the light source 20 may be set so as to not deviate from the glass 10.

Meanwhile, positions of lights L1 and L3 emitted from the light source 20 may be adjusted to enter the glass 10 at an angle (e.g., a predetermined angle) θ. Here, the angle θ may be an acute angle.

The angle θ may be varied depending on an environment in which a micro-defect is detected. In an embodiment, the angle θ may be determined in consideration of at least one of factors such as performance of the detection camera 30, a size of a defect to be detected, and a thickness of the glass 10. For example, when the performance of the detection camera 30 is high, the angle θ may be set to a relatively large angle, but when the performance of the detection camera 30 is low, the angle θ may be set to a relatively small angle. As another example, when the size of the defect to be detected is large (for example, when it is more than or equal to a predetermined value), the angle θ may be set to a relatively large angle, but when the size of the defect to be detected is small (for example, when it is less than a predetermined value), the angle θ may be set to a relatively small angle.

However, the present invention is not limited thereto, and when the performance of the detection camera 30 is sufficient and the size of the defect to be detected is large enough for the performance of the detection camera 30, the angle θ may be increased to 90 degrees such that the lights L1 and L3 emitted from the light source 20 may be made to enter the glass 10 perpendicularly.

As such, the lights L1 and L3 incident on the glass 10 at the angle θ may pass through the glass 10 and reach the detection camera 30 as lights L2 and L4. The detection camera 30 may receive the lights L2 and L4 to detect a defect in the edge region 14 of the glass 10.

In an embodiment, when a result of detecting a defect in the edge region 14 is not satisfied with a desired quality result or when it is determined that it is necessary to adjust quality of a defect detection result, such as when it has excessively high quality, the position of the light source 20 may be readjusted. In addition, a defect in the edge region 14 of the glass 10 may be detected by using the light source 20 of which position is readjusted.

Figure 2A:
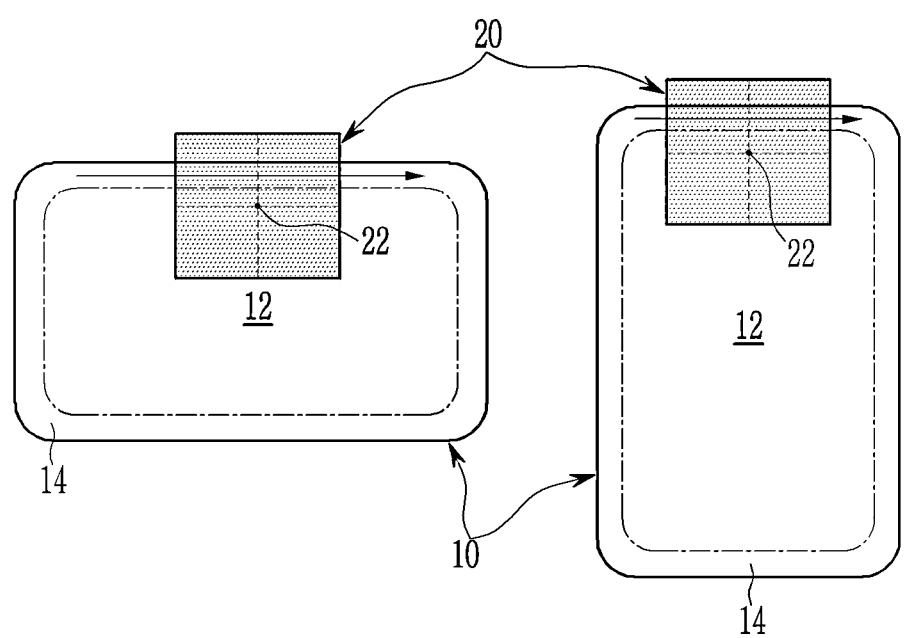

FIG. 2A and FIG. 2B illustrate schematic views for explaining an operation example of the apparatus for detecting the micro-defect of FIG. 1.

Referring to FIG. 2A, the glass 10 may rotate or perform linear movement on the apparatus 1 for detecting the micro-defect. In an embodiment, while the glass 10 is rotating or linearly moving, an entire edge region 14 of the glass 10 may be inspected. In the case of linear movement, the glass 10 may move in a direction of an arrow shown in FIG. 2A.

In the present embodiment, a center position 22 of the light source 20 may be set to overlap the inside of the edge region 14 or the inner region 12 of the glass 10. FIG. 2A illustrates a case in which the center position 22 of the light source 20 is set to overlap the inside of the inner region 12 of the glass 10, but, unlike this, the center position 22 of the light source 20 may be set to overlap the inside of the edge region 14 of the glass 10. It should be noted that, in any case, the center position 22 of the light source 20 may be set so as to not deviate from the glass 10.

FIG. 2B illustrates an example light source image viewed through the detection camera 30, and, in this case, a first light source image IMG1, for example, a light source image viewed through the detection camera 30 when a magnification thereof is 1 may be displayed. A second light source image IMG2, for example, a light source image viewed through the detection camera 30 when the magnification thereof is 2.5 may be displayed.

According to the embodiment described with reference to FIG. 1 to FIG. 2B, the center position 22 of the light source 20 is set so as to not deviate from the glass 10, and the position of the light source 20 is adjusted such that the lights L1 and L3 emitted from the light source 20 may enter the glass 10 at the angle θ; thus, in the edge region 14 of the glass 10, it is possible to improve visibility for micro-defects and it is possible to improve detection capacity to a level of about 10 μm.

Figure 3:
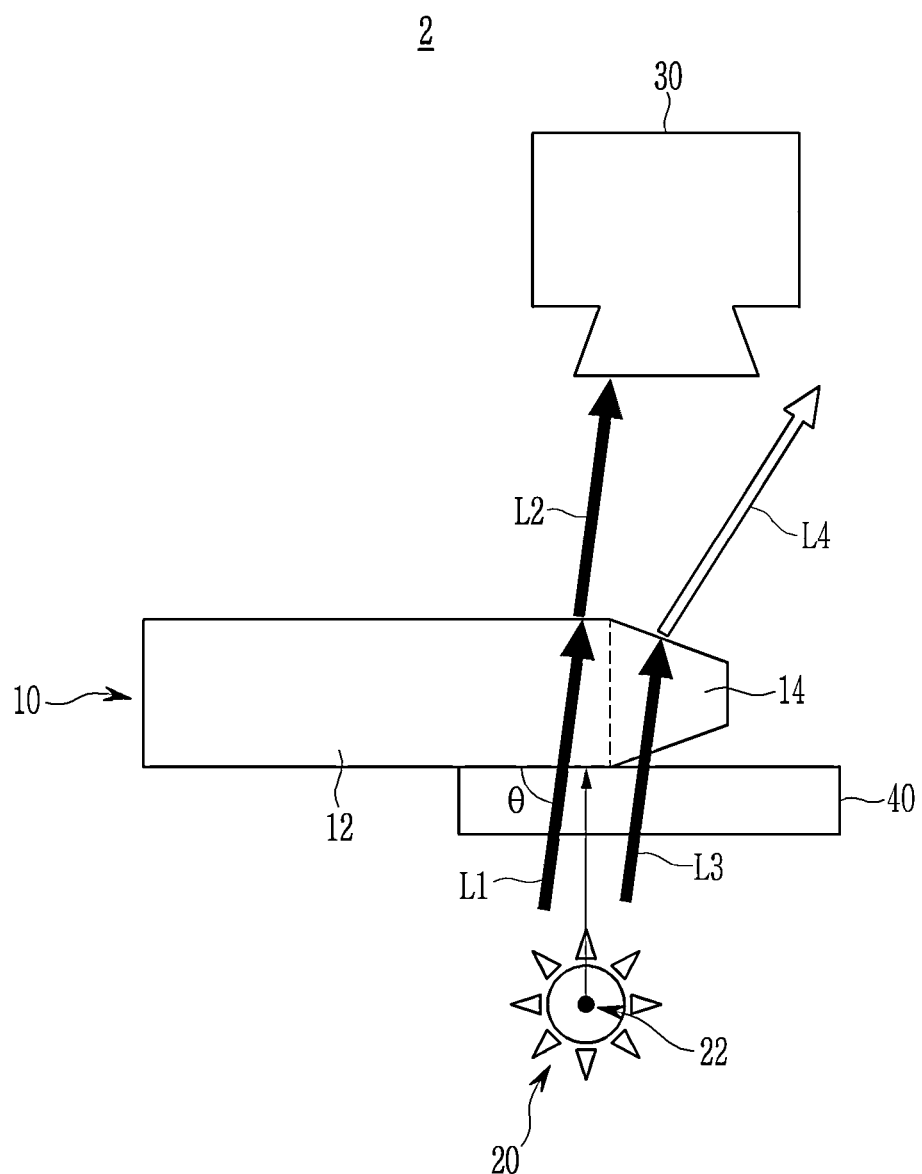
FIG. 3 illustrates a schematic view for explaining an apparatus for detecting a micro-defect according to an embodiment.

FIG. 3 illustrates a schematic view for explaining an apparatus for detecting a micro-defect according to an embodiment.

Referring to FIG. 3, in an apparatus 2 for detecting a micro-defect according to an embodiment, the center position 22 of the light source 20 may be set to correspond to the inside of the edge region 14 or the inner region 12 of the glass 10. In an embodiment, as indicated by an arrow extending vertically from the center position 22 of the light source 20 in FIG. 3, the center position 22 of the light source 20 may be set to correspond to the inside of the inner region 12 of the glass 10. However, unlike that shown in FIG. 3, the center position 22 of the light source 20 may be set to correspond to the inside of the edge region 14 of the glass 10. It should be noted that, in any case, the center position 22 of the light source 20 may be set so as to not deviate from the glass 10.

In the present embodiment, a polarizing member (or polarizer) 40 may be disposed under the glass 10. The polarizing member has a characteristic of passing only a specific direction of light. That is, the polarizing member 40 allows light having the same direction as that of a pattern engraved on the polarizing member 40 to pass, and does not pass light that does not match the direction thereof.

Positions of the lights L1 and L3 emitted from the light source 20 may be adjusted such that the lights L1 and L3 are incident on the polarizing member 40 and the glass 10 at an angle (e.g., a predetermined angle) 8. Here, the angle θ may be an acute angle. In addition, the lights L1 and L3 incident on the polarizing member 40 and the glass 10 at the angle θ may pass through the polarizing member 40 and the glass 10 and reach the detection camera 30 as lights L2 and L4. The detection camera 30 may receive the lights L2 and L4 passing through the polarizing member 40 and the glass 10 to detect a defect in the edge region 14 of the glass 10.

In an embodiment, when a result of detecting a defect in the edge region 14 is not satisfied with a desired quality result or when it is determined that it is necessary to adjust quality of a defect detection result, such as when it has excessively high quality, the position of the light source 20 may be readjusted. In addition, a defect in the edge region 14 of the glass 10 may be detected by using the light source 20 of which position is readjusted.

In some embodiments, the polarizing member 40 may be disposed to cover at least a portion of the edge region 14 of the glass 10, or may be disposed to cover at least a portion of the inner region 12 of the glass 10, but the present invention is not limited thereto.

Figure 4:
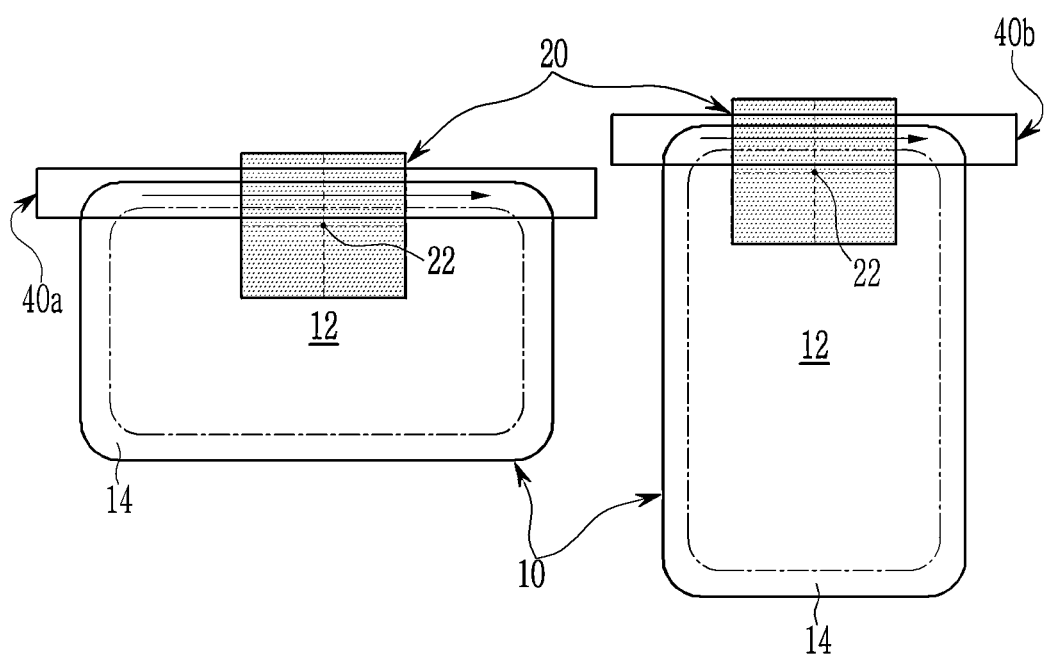
FIG. 4 illustrates a schematic view for explaining an operation example of the apparatus for detecting the micro-defect of FIG. 3.

FIG. 4 illustrates a schematic view for explaining an operation example of the apparatus for detecting the micro-defect of FIG. 3.

Referring to FIG. 4, the glass 10 may rotate or perform linear movement on the apparatus 2 for detecting the micro-defect. In an embodiment, while the glass 10 is rotating or linearly moving, an entire edge region 14 of the glass 10 may be inspected. In the case of linear movement, the glass 10 may move in a direction of an arrow shown in FIG. 4.

In an embodiment, the center position 22 of the light source 20 may be set to overlap the inside of the edge region 14 or the inner region 12 of the glass 10. FIG. 4 illustrates a case in which the center position 22 of the light source 20 is set to overlap the inside of the inner region 12 of the glass 10, but, unlike this, the center position 22 of the light source 20 may be set to overlap the inside of the edge region 14 of the glass 10. It should be noted that, in any case, the center position 22 of the light source 20 may be set so as to not deviate from the glass 10.

In addition, polarizing members 40a and 40b may be disposed to overlap the edge region 14 of the glass 10. FIG. 4 illustrates, for convenience of explanation, the polarizing members 40a and 40b only in portions of the edge regions 14 corresponding to one side of the glass 10, but the present invention is not limited thereto, and an arrangement shape of the polarizing members 40a and 40b may be varied according to a specific implementation purpose.

According to the embodiment described with reference to FIG. 3 and FIG. 4, the center position 22 of the light source 20 is set so as to not deviate from the glass 10, and the position of the light source 20 is adjusted such that the lights L1 and L3 emitted from the light source 20 may enter the glass 10 at the angle θ; thus, in the edge region 14 of the glass 10, it is possible to improve visibility for micro-defects and it is possible to improve detection capacity to a level of about 10 μm. In addition, since surface reflection and internal reflection that may occur when light for detecting micro-defects of a glass is incident on the glass by using the polarizing members 40, 40a, and 40b may be minimized or reduced, it is possible to significantly reduce a defect rate of products.

Figure 5:
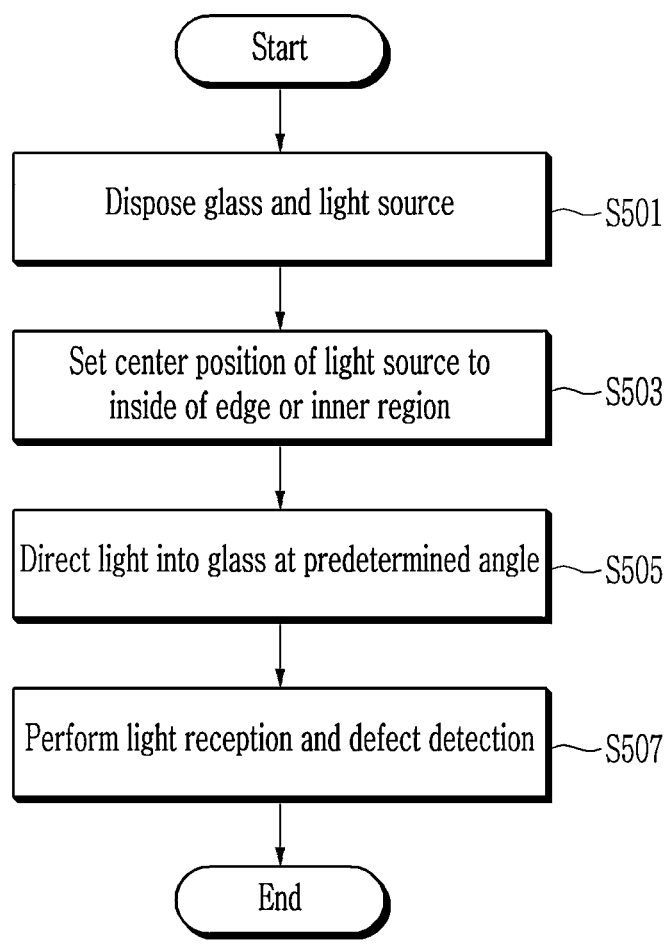
FIG. 5 illustrates a flowchart of a manufacturing method of a display device according to an embodiment.

FIG. 5 illustrates a flowchart of a manufacturing method of a display device according to an embodiment.

Referring to FIG. 5, a method of manufacturing a display device according to an embodiment may include disposing the glass 10 and the light source 20 (S501), setting the center position 22 of the light source 20 to the inside of the edge region 14 or the inner region 12 (S503), directing light into the glass 10 at an angle (e.g., a predetermined angle) (S505), and performing light reception and defect detection by using the detection camera 30 (S507).

The descriptions described above with reference to FIG. 1 to FIG. 4 may be referred to or applied for a more detailed description of tasks S501 to S507, and redundant descriptions thereof will be omitted.

Figure 6:
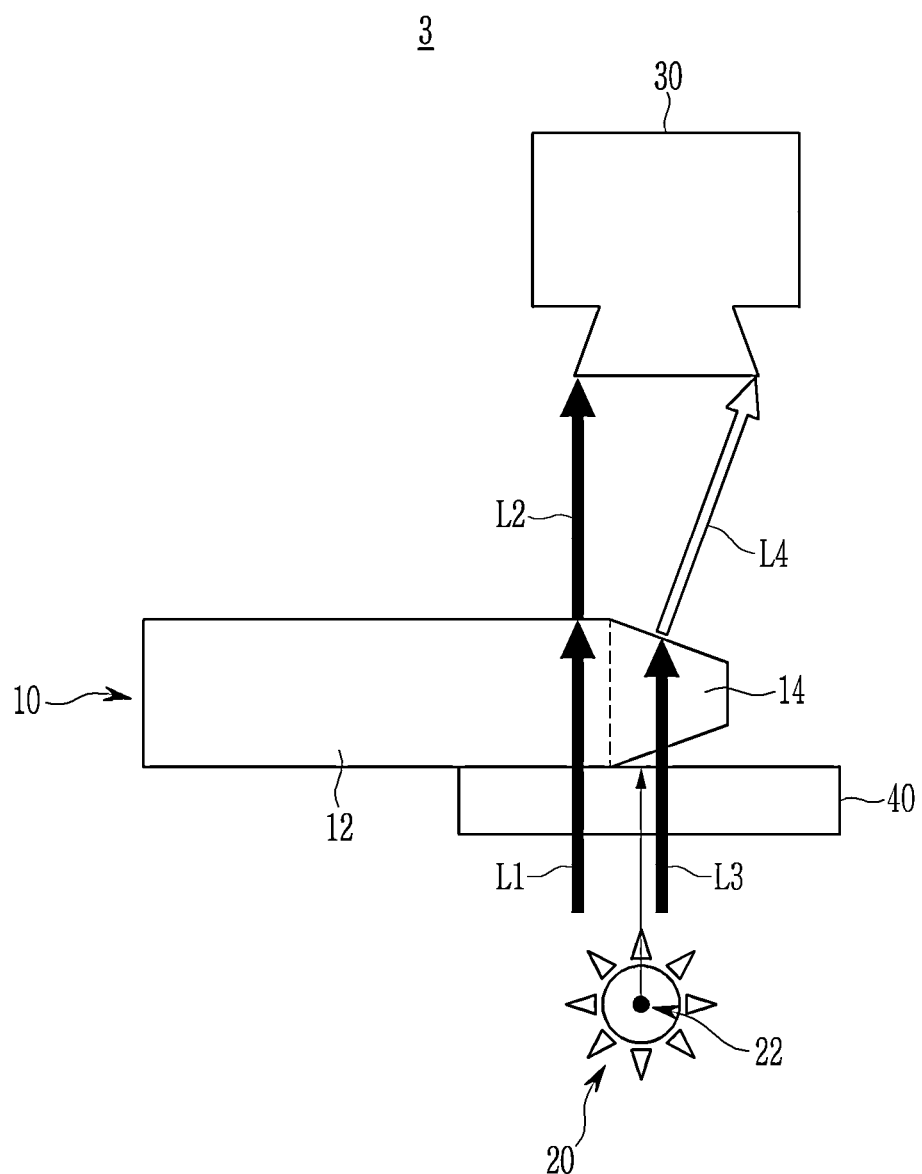
FIG. 6 illustrates a schematic view for explaining an apparatus for detecting a micro-defect according to an embodiment.

FIG. 6 illustrates a schematic view for explaining an apparatus for detecting a micro-defect according to an embodiment.

Referring to FIG. 6, in an apparatus 3 for detecting a micro-defect according to an embodiment, the center position 22 of the light source 20 may be set to correspond to the inside or outside of the edge region 14 of the glass 10. In an embodiment, as indicated by an arrow extending vertically from the center position 22 of the light source 20 in FIG. 6, the center position 22 of the light source 20 may be set to correspond to the inside of the edge region 14 of the glass 10.

In addition, in the present embodiment, the polarizing member 40 may be disposed under the glass 10, and positions of the lights L1 and L3 emitted from the light source 20 may be adjusted such that the lights L1 and L3 are vertically incident on the glass 10.

In an embodiment, when a result of detecting a defect in the edge region 14 is not satisfied with a desired quality result or when it is determined that it is necessary to adjust quality of a defect detection result, such as when it has excessively high quality, the position of the light source 20 may be readjusted. In addition, a defect in the edge region 14 of the glass 10 may be detected by using the light source 20 of which position is readjusted. Accordingly, the lights L1 and L3 emitted from the light source 20 may be adjusted to enter the glass 10 at an angle (e.g., a predetermined angle), for example, an acute angle.

In some embodiments, the polarizing member 40 may be disposed to cover at least a portion of the inside of the edge region 14 of the glass 10, or may be disposed to cover at least a portion of the outside of the edge region 14 of the glass 10, but the present invention is not limited thereto.

Figure 7:
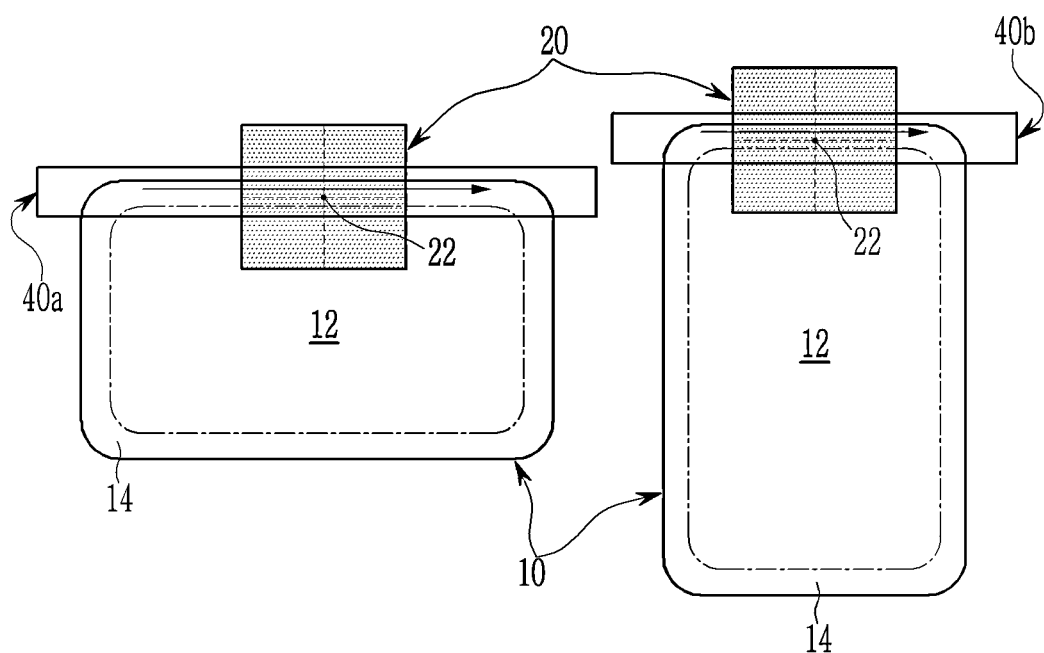
FIG. 7 illustrates a schematic view for explaining an operation example of the apparatus for detecting the micro-defect of FIG. 6.

FIG. 7 illustrates a schematic view for explaining an operation example of the apparatus for detecting the micro-defect of FIG. 6.

Referring to FIG. 7, the glass 10 may rotate or perform linear movement on the apparatus 3 for detecting the micro-defect. In an embodiment, while the glass 10 is rotating or linearly moving, an entire edge region 14 of the glass 10 may be inspected. In the case of linear movement, the glass 10 may move in a direction of an arrow shown in FIG. 7.

In the present embodiment, the center position 22 of the light source 20 may be set to overlap the inside of the edge region 14 of the glass 10. In addition, the polarizing members 40a and 40b may be disposed to overlap the edge region 14 of the glass 10. FIG. 7 illustrates, for convenience of explanation, the polarizing members 40a and 40b only in portions of the edge regions 14 corresponding to one side of the glass 10, but the present invention is not limited thereto, and an arrangement shape of the polarizing members 40a and 40b may be varied according to a specific implementation purpose.

According to the embodiment described with reference to FIG. 6 and FIG. 7, even when the lights L1 and L3 emitted from the light source 20 do not enter the glass 10 at an acute angle, based on an environment according to a specific implementation purpose, when the performance of the detection camera 30 is sufficient and the size of the defect to be detected is large enough for the performance of the detection camera 30, good visibility and detection power may be obtained, and since surface reflection and internal reflection that may occur when light for detecting micro-defects of a glass is incident on the glass by using the polarizing members 40, 40a, and 40b may be minimized or reduced, it is possible to significantly reduce a defect rate of products.

Figure 8:
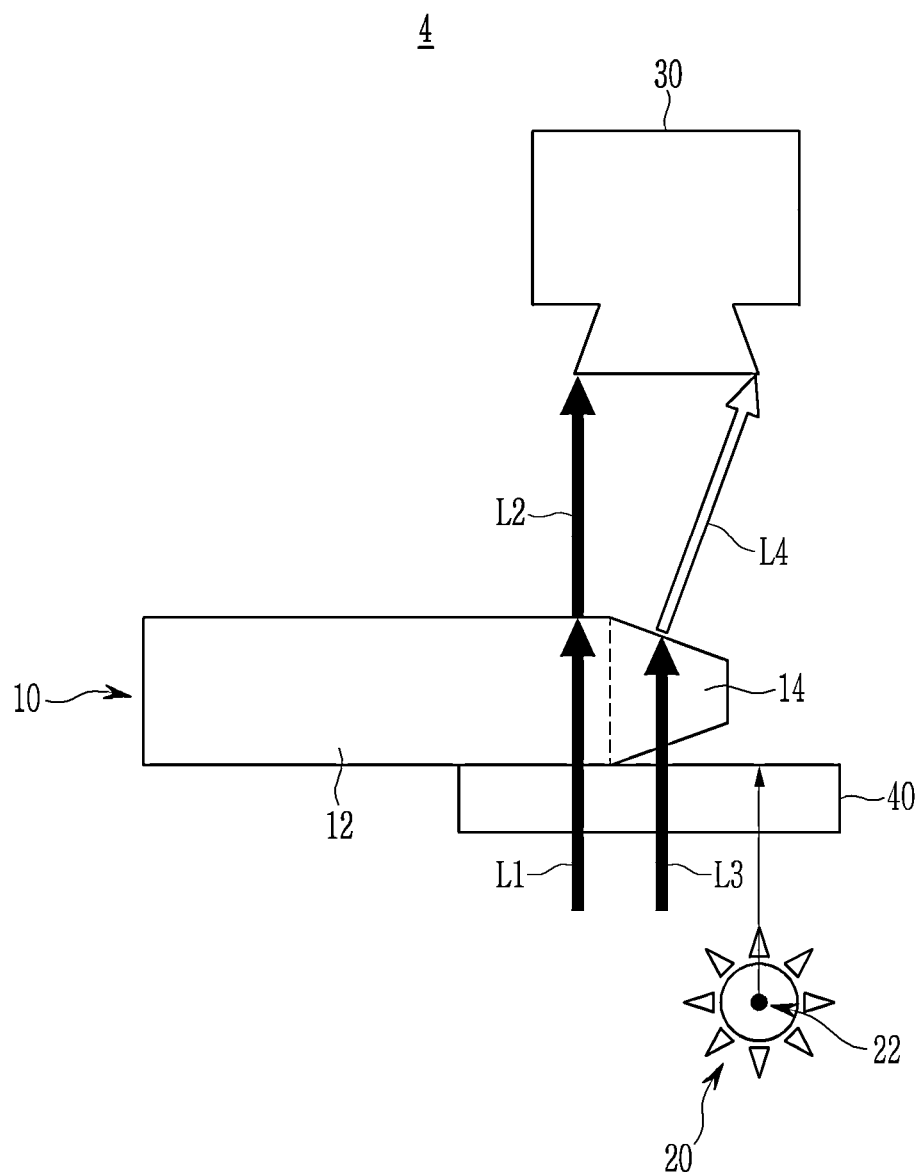
FIG. 8 illustrates a schematic view for explaining an apparatus for detecting a micro-defect according to an embodiment.

FIG. 8 illustrates a schematic view for explaining an apparatus for detecting a micro-defect according to an embodiment.

Referring to FIG. 8, in an apparatus 4 for detecting a micro-defect according to an embodiment, as indicated by an arrow extending vertically from the center position 22 of the light source 20, the center position 22 of the light source 20 may be set to correspond to the outside of the edge region 14 of the glass 10. That is, the center position 22 of the light source 20 may be set to deviate from the glass 10.

In addition, in the present embodiment, the polarizing member 40 may be disposed under the glass 10, and positions of the lights L1 and L3 emitted from the light source 20 may be adjusted such that the lights L1 and L3 are vertically incident on the glass 10.

In an embodiment, when a result of detecting a defect in the edge region 14 is not satisfied with a desired quality result or when it is determined that it is necessary to adjust quality of a defect detection result, such as when it has excessively high quality, the position of the light source 20 may be readjusted. In addition, a defect in the edge region 14 of the glass 10 may be detected by using the light source 20 of which position is readjusted.

In some embodiments, the polarizing member 40 may be disposed to cover at least a portion of the inside of the edge region 14 of the glass 10, or may be disposed to cover at least a portion of the outside of the edge region 14 of the glass 10, but the present invention is not limited thereto.

Figure 9:
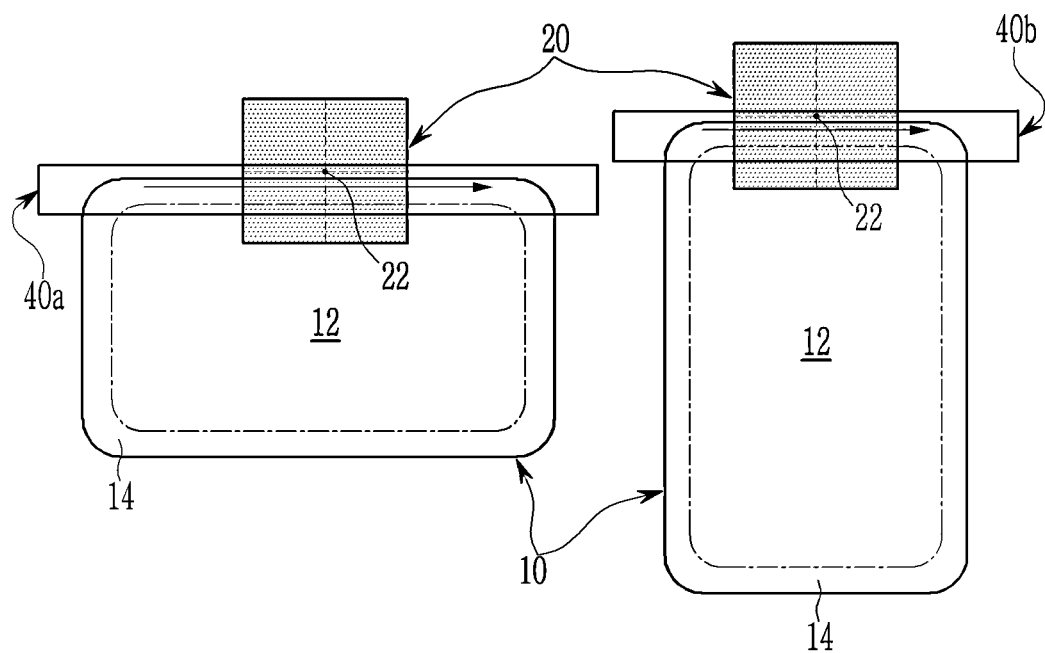
FIG. 9 illustrates a schematic view for explaining an operation example of the apparatus for detecting the micro-defect of FIG. 8.

FIG. 9 illustrates a schematic view for explaining an operation example of the apparatus for detecting the micro-defect of FIG. 8.

Referring to FIG. 9, the glass 10 may rotate or perform linear movement on the apparatus 4 for detecting the micro-defect. In an embodiment, while the glass 10 is rotating or linearly moving, an entire edge region 14 of the glass 10 may be inspected. In the case of linear movement, the glass 10 may move in a direction of an arrow shown in FIG. 9.

In the present embodiment, the center position 22 of the light source 20 may be set to overlap the outside of the edge region 14 of the glass 10. In addition, the polarizing members 40a and 40b may be disposed to overlap the edge region 14 of the glass 10. Further, the center position 22 of the light source 20 may be in a range overlapping the polarizing members 40a and 40b. FIG. 9 illustrates, for convenience of explanation, the polarizing members 40a and 40b only in portions of the edge regions 14 corresponding to one side of the glass 10, but the present invention is not limited thereto, and an arrangement shape of the polarizing members 40a and 40b may be varied according to a specific implementation purpose.

According to the embodiment described with reference to FIG. 8 and FIG. 9, even when the center position of the light source 20 is set to deviate from the glass 10, based on an environment according to a specific implementation purpose, when the performance of the detection camera 30 is sufficient and the size of the defect to be detected is large enough for the performance of the detection camera 30, good visibility and detection power may be obtained, and since surface reflection and internal reflection that may occur when light for detecting micro-defects of a glass is incident on the glass by using the polarizing members 40, 40a, and 40b may be minimized or reduced, it is possible to significantly reduce a defect rate of products.

Figure 10:
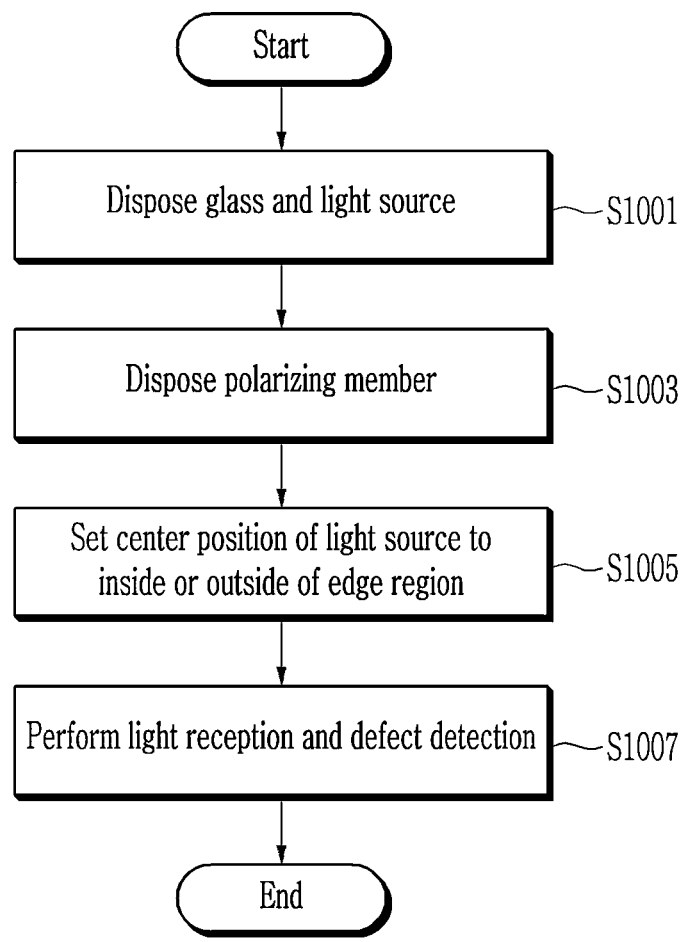
FIG. 10 illustrates a flowchart of a manufacturing method of a display device according to an embodiment.

FIG. 10 illustrates a flowchart of a manufacturing method of a display device according to an embodiment.

Referring to FIG. 10, a method of manufacturing a display device according to an embodiment may include disposing the glass 10 and the light source 20 (S1001), disposing the polarizing member 40 (S1003), setting the center position 22 of the light source 20 to the inside or outside of the edge region 14 (S1005), and performing light reception and defect detection by using the detection camera 30 after light is incident on the polarizing member 40 and the glass 10 (S1007).

The descriptions described above with reference to FIG. 6 and FIG. 9 may be referred to or applied for a more detailed description of tasks S1001 to S1007, and redundant descriptions thereof will be omitted.

In an embodiment, a method of manufacturing the display device according to an embodiment may include: providing the glass 10 including the edge region 14 and the inner region 12; disposing the light source 20 under the glass 10; setting the center position 22 of the light source 20 to correspond to a first point of the glass 10; directing light onto the glass 10 by using the light source 20; and first detecting a defect in the edge region 14 of the glass 10 by receiving light passing through the glass 10 through the detection camera 30.

In addition, the method may include: adjusting the center position 22 of the light source 20 to correspond to a second point of the glass 10 based on a result obtained by the first detecting; and second detecting a defect in the edge region 14 by using the light source 10 with the adjusted center position 22. For example, when the result obtained by the first detecting is not satisfied with a desired quality result or when it is determined that it is necessary to adjust quality of the detected defect result, such as when it has excessively high quality, after moving the center position 22 to a position corresponding to the second point different from the first point, the second detecting may be performed.

Further, in an embodiment, the method may include: calculating an association with the center position 22 of the light source 10 to obtain a desired detection result quality, based on data on at least one of the first point, the first detection result, the second point, and the second detection result; and determining the center position 22 of the light source 10 based on the association, and this association may be built into a database including the desired detection result quality and a value of the center position 22 corresponding thereto.

Accordingly, by simply applying the derived association to a subsequent inspection process, it is possible to reduce the cost and time required for the test process for setting the center position 22 of the light source 20 during the inspection process and to improve the quality of the inspection result.

Figure 11:
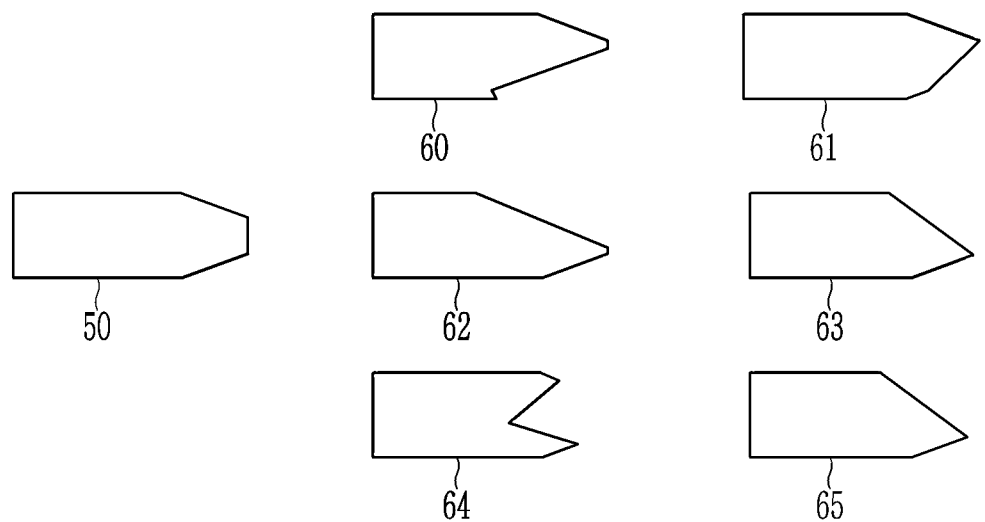
FIG. 11 illustrates examples of micro-defects that may be detected in a manufacturing method of a display device according to embodiments.

FIG. 11 illustrates examples of micro-defects that may be detected in a manufacturing method of a display device according to embodiments.

FIG. 11 illustrates cross-sections 60 to 65 of the glass 10 in which micro-defects, mainly cracks, occur, compared to a cross-section 50 of the glass 10 having a normal shape that may be detected according to the method of manufacturing the display device according to embodiments. In addition, it will be apparent that various micro-defects including scratches or foreign materials that may occur in the edge region 14 of the glass 10 may be detected according to the method of manufacturing the display device according to embodiments.

Figure 12A:
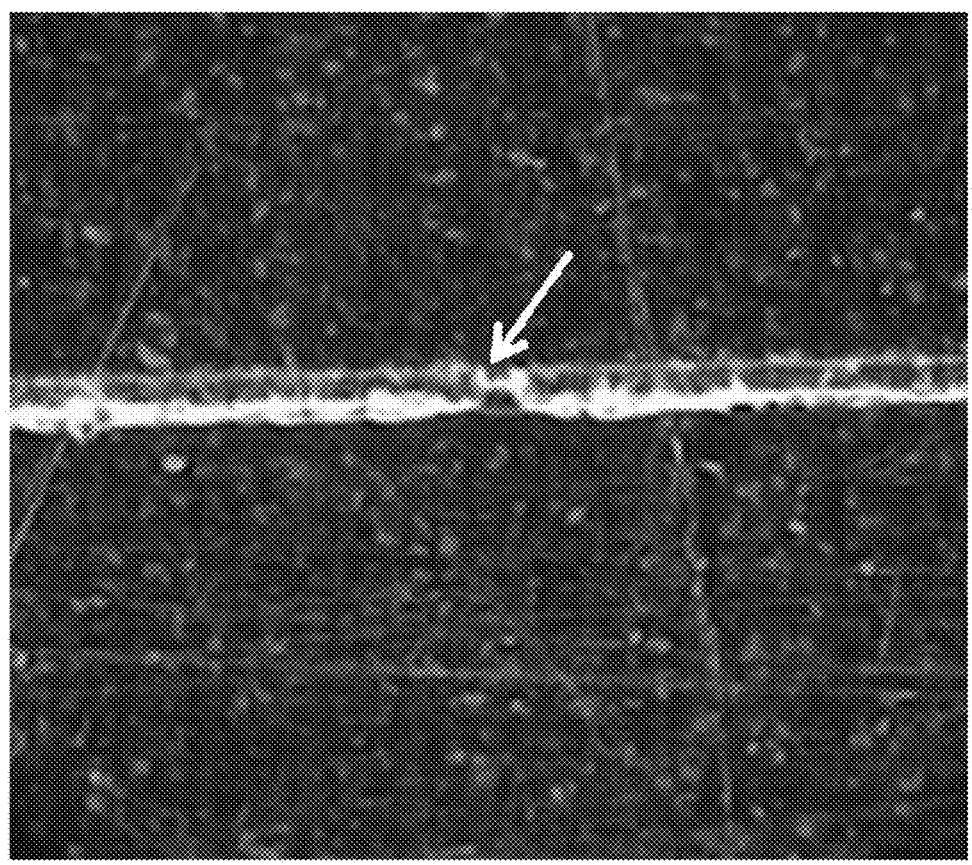
FIGS. 12A to 12C illustrate examples of detection results according to a manufacturing method of a display device according to embodiments.
Figure 12B:
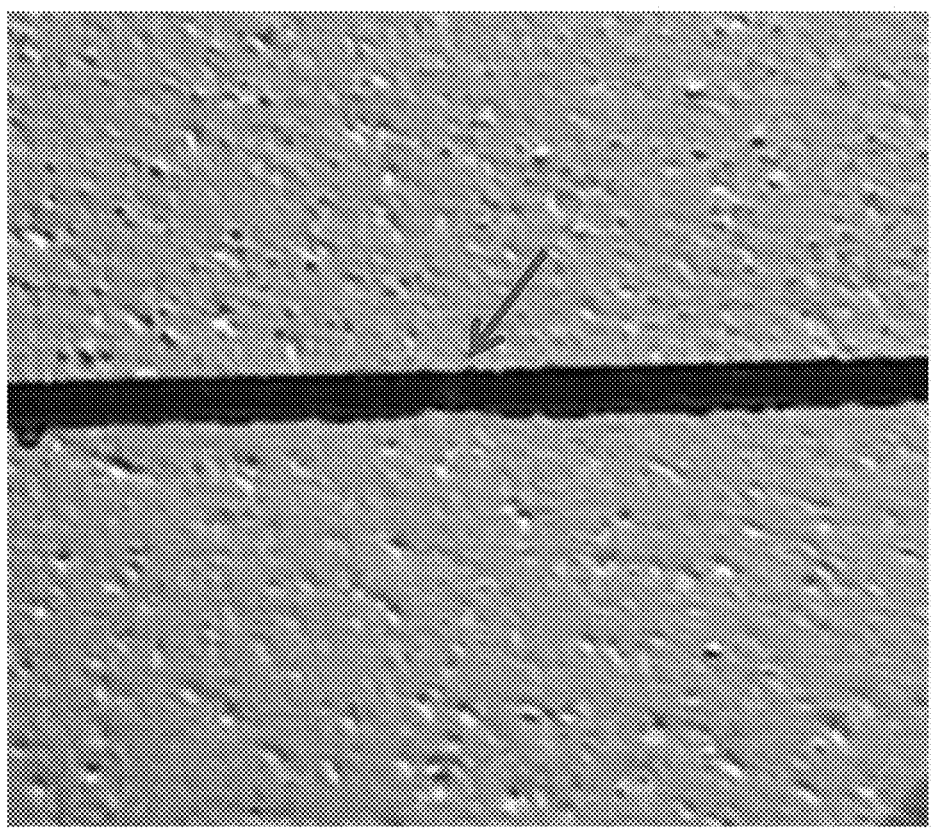
Figure 12C:
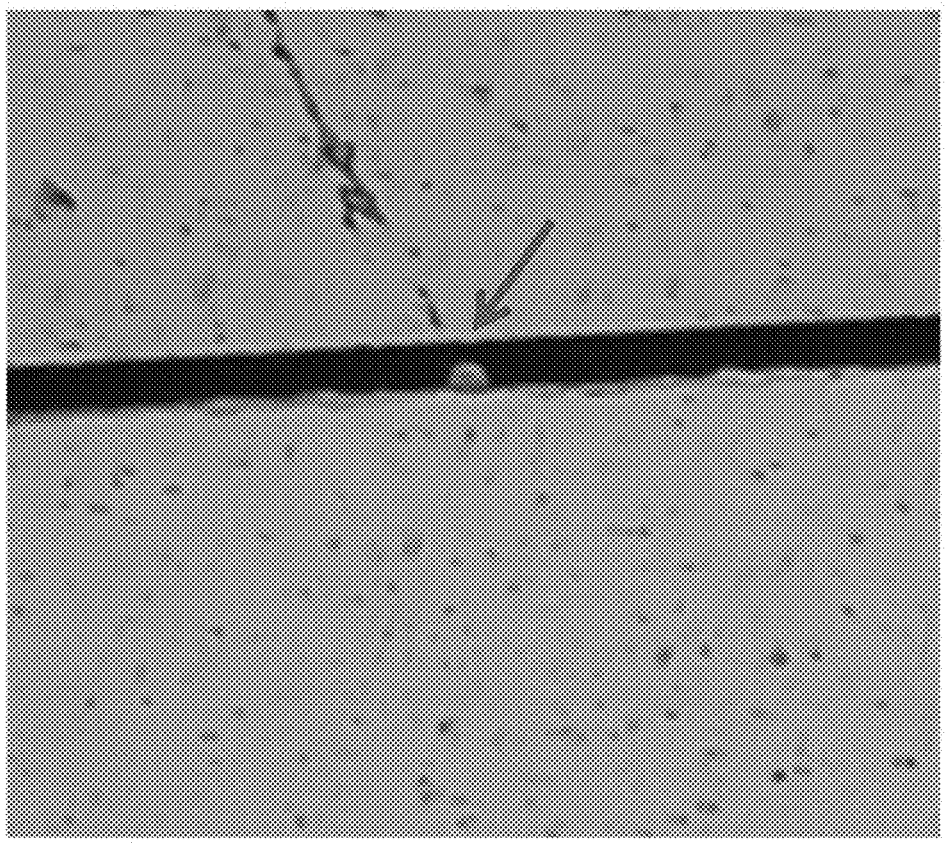

FIGS. 12A to 12C illustrate examples of detection results according to a manufacturing method of a display device according to embodiments.

FIG. 12A shows a result of detecting the edge region 14 in a manner in which light emitted from the light source 20 is reflected on the glass 10 rather than transmitting through the glass 10.

FIG. 12B shows a result of detecting the edge region 14 through a method in which the light emitted from the light source 20 transmits through the glass 10, and, in this case, the center position 22 of the light source 20 is not adjusted, or the polarizing member 40 is not applied.

FIG. 12C shows a result of detecting the edge region 14 by adjusting the center position 22 of the light source 20 or applying the polarizing member 40 as described above, and referring to FIG. 12C, it can be seen that the micro-defect in the edge region 14, which was not detected in FIGS. 12A and 12B, was clearly detected, such that visibility and detection capacity were remarkably improved.

According to embodiments, by adjusting the center position of the light source emitting light for detecting the micro-defect of the glass and the incident angle of light to the glass, it is possible to improve visibility and detection capacity for the micro-defect in the edge region of the glass. Since surface reflection and internal reflection that may occur when light for detecting the micro-defect of the glass is incident on the glass by using the polarizing member may be minimized or reduced, it is possible to significantly reduce a defect rate of products.

In addition, according to embodiments, by calculating correlation between the center position of the light source and a result quality for obtaining a desired detection result quality and by applying the correlation to a subsequent inspection process, it is possible to improve quality of inspection results while reducing a cost and time required in an inspection process.

While this disclosure has been described in connection with what are presently considered to be some practical example embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a display device, the method comprising:
   providing a glass including an edge region and an inner region;
   arranging a light source under the glass;
   setting a center position of the light source to correspond to a first point of the glass;
   directing light into the glass by using the light source;
   first detecting a defect in the edge region of the glass by receiving light passing through the glass by using a detection camera;
   adjusting the center position of the light source to correspond to a second point of the glass based on a quality of a result obtained by the first detecting; and
   second detecting a defect in the edge region by using the light source with the adjusted center position to obtain a result having a quality different from that obtained by the first detecting.

2. The method of manufacturing the display device of claim 1, further comprising:

calculating an association with the center position of the light source to obtain a desired detection result quality, based on data of at least one of the first point, the result obtained by the first detecting, the second point, and a result obtained by the second detecting; and determining the center position of the light source based on the association.

3. The method of manufacturing the display device of claim 1, wherein the directing of the light into the glass further comprises adjusting a position of the light source such that light emitted from the light source enters the glass at an angle.

4. The method of manufacturing the display device of claim 1, wherein the directing of the light into the glass comprises vertically directing the light emitted from the light source into the glass.

5. The method of manufacturing the display device of claim 1, further comprising arranging a polarizing member under the glass.

* * * * *